Patented June 4, 1940

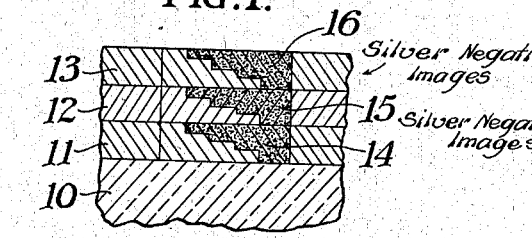
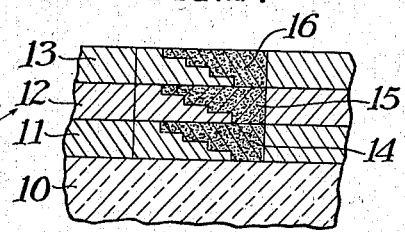
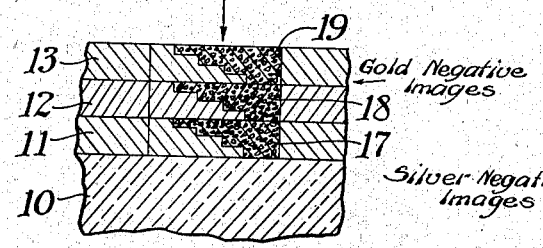
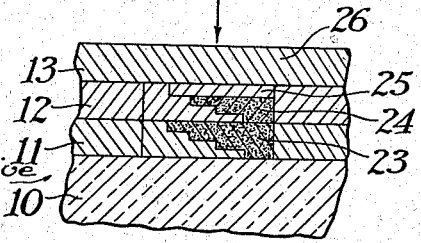
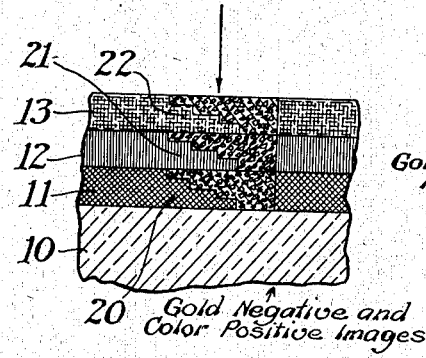
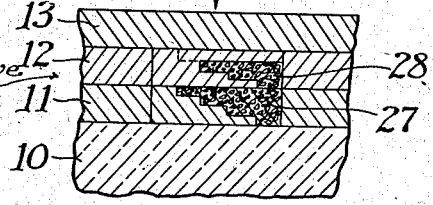
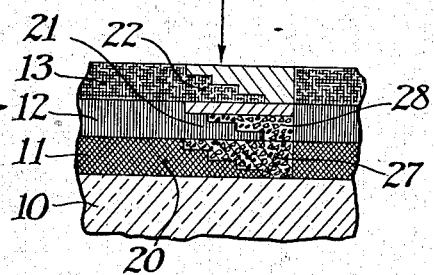

2,203,653

UNITED STATES PATENT OFFICE 2,203,653

INTEGRAL MASK FOR COLOR FILM

Ralph M. Evans, Rochester, N. Y., assignor to Eastman Kodak Company, Rochester, N. Y., a corporation of New Jersey Application April 27, 1937, Serial No. 139,252

3 Claims. (Cl. 95—2)

This invention relates to color correction in printing color transparencies and particularly to an integral mask for securing color correction in printing high-contrast color transparencies.

In photo-mechanical process work where a colored original is to be copied, it is necessary to make some correction for the deficiencies of the positive inks or pigments used to print the final picture. This correction may be done by hand retouching, but masking methods have been devised in which positives of low contrast are used to mask the color-separation negatives or certain of the color-separation negatives in order to overcome these deficiencies in the ink. For example, masks are used for the green and blue filter separation negatives, respectively, in exposing the magenta and yellow printing positives. This procedure lowers the density of the magenta and yellow positives in those portions of the picture where blue-green is printed and hence lowers the contrast of the magenta and yellow images in the scale of greys. When compensation for this lowering of contrast is made, as by increasing the contrasts of the green and blue filter negatives, the scale of greys is correctly rendered and the saturations of the magenta, yellows and reds is increased. At the same time the amount of magenta printed over green and of yellow printed over blue remains less than without color correction, thus compensating for the green or blue light absorption of the blue-green ink or pigment.

This method of color correction is applicable only to color-separation images and cannot be employed in printing color transparencies, such as multi-colored images contained in gelatin layers on a single support. In films or plates of this type a natural-color image is contained on a single film and may be projected or viewed without recourse to filters, or mechanical or optical color-forming arrangements. In general, in color processes of this type it is desirable to have a high-contrast image. The reason for this lies in the fact that in the reproduction of a color photographically, there is usually a distinct loss in color saturation. This loss is due to a broadening and flattening of the absorption bands of the spectrum of the original color by admixture of white light and by the impurities of the dyes used in the reproduction process. Increasing the contrast of the color process deepens and sharpens these absorption bands and so tends to give a color which may be made equal to, or higher than, the saturation of the original.

When an attempt is made to duplicate such a color photograph by means of the same process or any other process which has a high contrast, the finished duplicate has too great a contrast, or "gamma," since the gammas of the two images multiply on printing. In printing color photographs of this type, the contrast may be lowered by inserting a negative image of the black-and-white values of the original over the color photograph during printing. However, this method introduces the necessity of securing exact registry of the color photograph and of the negative mask, which is accompanied by time-consuming difficulties. It is also necessary to resort to an extra printing step in order to obtain this negative masking image.

It is, therefore, an object of the present invention to provide a means for masking in order to secure color correction in printing natural-color transparencies. A further object is to provide a masking means which eliminates the necessity of registration of the original and masking images during printing. Other objects will appear from the following description of my invention.

These objects are accomplished by forming a mask representing the black-and-white values of the original subject, the mask being integral with the original film or plate and in the same photographic layer or layers. Methods and means for accomplishing these results comprise the subject of the present invention.

In the accompanying drawing Fig. 1 is a flow-diagram representing enlarged sectional views of a film showing one method of forming a masked image according to my invention.

Fig. 2 is a flow-diagram representing enlarged sectional views of a film showing the stages in another method of forming a masked image according to my invention.

The general method of procedure according to my invention consists in forming the masking image as part of the original process of making the color original. No registry problems are, therefore, involved.

According to my preferred method of procedure a film is used having three-superposed differentially sensitized photographic layers on one side of a support. A film of this type is described in Patent No. 2,113,329, granted April 5, 1938, to L. D. Mannes and L. Godowsky, Jr. This film is designed for exposure in a camera and the formation of images by a coupling of the oxidation product of the developer with a coupling compound. The coupling compound may be contained in the developer or may be present originally as a substantially colorless substance in the photographic layers.

After exposure, the film is developed in an ordinary developer, such as an elon-hydroquinone developer, which forms metallic silver images at the exposed portions of the film. A film of this type is shown in Fig. 1 of the drawing which represents a film after exposure to a step wedge, that is, a gray scale. As shown in Fig. 1, 10 is a transparent support of any suitable material, such as glass or a cellulose ester having superposed thereon layers 11, 12 and 13 sensitive, respectively, to red, green and blue light. A yellow filter dye may be contained in the layer 13 or between the layers 12 and 13 to prevent the action of blue light on the sensitive layers 11 and 12. After exposure and development of this film, the layer 11 contains a silver image 14, the layer 12 contains a silver image 15 and the layer 13 contains a silver image 16, each of the images 14, 15 and 16 increasing in density corresponding to the original exposure series.

The metallic silver images 14, 15 and 16 are then transformed to images of any suitable material which resists the action of the processing baths used in subsequent steps of the color-forming process. A substance of this type is metallic gold and as shown in the second stage of Fig. 1 the silver images have been transformed to metallic gold images 17, 18 and 19. The gold images are represented as being of more grainy structure than the silver images. This is merely for the purpose of distinguishing the illustrations and is not necessarily true in practice.

During this procedure, the sensitive silver salt in the unexposed portions of the film has not been affected and it may, therefore, be exposed and redeveloped to form colored images. The film is re-exposed and subjected to a series of color-forming steps, for example, as described in Patent No. 2,113,329 and colored images are thereby formed in the unexposed portions of each of the layers. As shown in the third stage of Fig. 1, by this procedure a blue-green image 20 is formed in layer 11, a magenta image 21 is formed in layer 12 and a yellow image 22 is formed in layer 13. When this film is used to print onto a similar film in which colored images are to be formed, the masking images 17, 18, 19 reduce the contrast of the colored images 20, 21 and 22 without affecting their color saturation and thereby enable the making of a print having colored images of correct contrast.

It is also possible, according to my invention, to control several variables useful in the reproduction of colored images. In addition to the control of contrast, as described above, it is also possible to control color balance and overall density of the print.

The color balance of a color process may vary in numerous ways. Considering three-color subtractive processes, the effective speeds of the process to the three primary colors may be different, or the light source used to expose the picture may have a different spectral image distribution than that for which the film was designed, or the picture for some reason may have been exposed through a filter which has altered the spectral distribution of the light source. All these have the effect of shifting the color response curves parallel to each other. For these defects no treatment of the mask is effective but its action under all conditions permits of correction in the printing process by a change in the color sensitivity balance of the color process used for reproduction to the extent that this is possible without the mask. The color photograph may also have incorrect color balance because the effective gammas of the three color-curves are different. In this case the color mask permits of modification in the relative color gammas during the duplicating process by modification of the spectral energy distribution of the light used in the final printing operation without interfering with the colors so obtained.

Another type of lack of color balance arises from the fact that the dyes used in the original colored image do not all have equal color purities. Assume for illustration that the yellow record has no absorption in its maximum transmission region, that the magenta record has some absorption in its transmission regions but chiefly in its blue transmission band, and that the blue-green record has a considerable absorption in the blue and green regions. This is typical of most color processes. The action of a yellow filter in making a separate mask, would then be as follows: The mask would receive an exposure which was not affected by the yellow image but decreased slowly by increasing magenta image and decreased more rapidly by increasing blue-green image. The use of this mask in registry with the image would accordingly tend to give an uniform admixture of black with all colors of the record. By extending this method the mask may be made to overcompensate for the lack of purity of the dyes in the picture being copied in such a way that partial compensation may be obtained for the impurity of the dyes used in the reproduction process.

According to my method of procedure some correctiton for lack of color balance and deficiencies in the transmission of the positive dyes used may be obtained simultaneously with reduction of contrast during the printing operation.

This is illustrated by the following method.

As shown in Fig. 2 metallic silver images 14, 15 and 16 are formed in layers 11, 12 and 13 in the same manner as in the method described above. The film is then treated in a neutral potassium permanganate bleach bath which may be controlled with respect to diffusion into the layers. This bleach bath reduces the density of the silver images and may be allowed to entirely destroy the silver image in the upper layer or layers. After this bleaching operation, as shown in the next stage of Fig. 2 the film contains a silver image 23 of slightly reduced density in the lowest layer 11, a silver image 24 in layer 12 in which the permanganate bleach has proceeded to such an extent that the image is reduced in density as shown at 25. The silver image in the layer 13 has then been substantially entirely dissolved as shown at 26. The film is then treated in a sulfite bath to remove oxidation products of the permanganate, and the metallic silver images converted to metallic gold as in the previous method of procedure. The extent to which the silver images are converted to metallic gold images for example, by varying the time of treatment, concentration, etc., of the gold toning bath may also be controlled so that the gamma of the gold masking images may be controlled at this step. This permits a control of the amount of contrast reduction obtained.

As shown in the third stage of Fig. 2, the film then contains metallic gold image 27 in layer 11 and metallic gold image 28 in layer 12. The layer 13 contains no visible metallic image at this stage.

In the gold toning operation the metallic silver of the image is converted to the silver salt corresponding to the original gold salt or to the most insoluble silver compound that can be formed from the ions present. This silver salt must be removed along with any remaining unoxidized metallic silver. This may be done in various ways. If the gold salt is gold thiocyanate, silver thiocyanate is formed and this may be quantitatively re-converted to metallic salt by re-immersion for a short time in a metol-hydroquinone developer, all the silver is then removed by a permanganate sulfuric acid bleach. If the gold salt is gold sulfate the silver is converted to silver sulfate which is partially soluble in water or acid but is also completely removed by a subsequent permanganate or acid bath. If the gold salt is gold chloride a differential fixing bath may be used which removes the silver chloride but not the silver bromide, which is necessary for subsequent formation of the colored image.

The film after formation of the gold masking images 27 and 28 is then subjected to the processing procedure described in Patent No. 2,113,329 and blue-green image 20, magenta image 21 and yellow image 22 are formed in the layers 11, 12 and 13, respectively. This is shown in the last stage of Fig. 2 of the accompanying drawing. Since the blue-green image requires the greatest amount of correction and the magenta image requires a less amount of correction, the gold images 27 and 28 are designed in this modification of my invention to reduce the contrast of the blue-green and magenta images without affecting that of the yellow image, so that a correction for color balance is thereby obtained.

The following specific example illustrates the method of forming masking images as illustrated in Fig. 2 of the drawing.

The three-layer film after exposure is developed in a developer of the following composition:

Monomethyl paraaminophenol
  sulfate_____grams__ 5
Hydroquinone_____do____ 10
Sodium sulfite_____do____ 75
Sodium carbonate_____do____ 30
Potassium bromide_____do____ 4.5
Potassium thiocyanate_____do____ 1
Water to_____liter__ 1

In order to reduce the density of the metallic silver image in the top layer and part of the middle layer and any developer fog which the film may contain, the film is treated in a permanganate bleach bath of the following composition:

Potassium permanganate_____grams__ 2.5
Sodium sulfate_____do____ 140
Sodium chloride_____do____ 5
Acetic acid_____c. c.__ 2
Water to_____liter__ 1

After a few minutes the silver image in the top layer is completely removed while the two lower images are only slightly affected. The time of treatment in the permanganate bath may be controlled to determine the relative amounts of silver image left in the three layers, although the top image is always removed to a greater extent than the lower ones.

In order to remove the oxidation products of the permanganate resulting from treatment in the toning bleach bath the film is then treated for a few minutes in a bisulfite clearing bath consisting of 15 grams of bisulfite per liter of water.

The film is then treated in a gold toning bath of the following composition:

Gold chloride_____grams per liter__ 2 to 2.5
Sodium acetate__sufficient to buffer to a pH of 4.5

The film after treatment for a few minutes in the gold toning bath or for a sufficient length of time to form a gold image of the desired density is subjected to an ammonia differential fixing bath comprising a saturated aqueous solution of silver bromide containing 32 grams per liter of ammonium hydroxide.

The formation of the masking image is thereby completed and the film is next subjected to an acid permanganate bleach bath of the following composition:

Potassium permanganate (4% solution).
                                          grams__ 1
Sulfuric acid (20% solution)_____do____ 1
Water_____do____ 20

This bath removes any residual metallic silver and prepares the film for re-exposure and development to form colored images as described in Patent No. 2,113,329.

The gold mask formed according to my invention is almost a neutral gray, having a slight bluish color. It is not necessary for the mask to be a neutral gray, however, as any spectral color may be used in the mask, the color being chosen with regard to such correction of the color balance and other factors as may be necessary.

Other methods of forming masks may be resorted to according to my invention. Instead of forming a mask of gold or other inert metallic substance it is also possible to use a dye whose silver salt is insoluble and which is sufficiently stable to withstand the action of the oxidizing and reducing baths of the color-forming process to which the film is subjected after formation of the masking image. Such dye may be applied after the negative development in conjunction with an oxidizing bath which is capable of converting metallic silver to the dye salt. It is also possible to carry out the original negative development in a developer consisting essentially of a developing agent, coupling agent, sulfite and alkali so that there is formed, simultaneously with the formation of the negative silver image, an insoluble dye image of the required color which will remain after the removal of the silver image.

It is to be understood that numerous modifications and changes may be made in the specific features of my invention and that my invention is to be taken as limited only by the scope of the appended claims.

What I claim is:

1. A photographic element for printing a colored image having substantially the same color values as the original subject, comprising three superposed gelatin layers containing positive substantially pure dye images which together form a natural-color image of the subject, and at least one metallic gold negative image of the subject, having sufficient density to serve as a correcting mask on printing and being inert to silver solvents, in the same photographic layers.

2. The method of making a colored photographic printing element, which comprises exposing a multi-layer, differentially-sensitized photographic element to a colored object, forming at least one metallic gold, negative image of the object in the element, said image being a negative image representing the color which the layer in which is it located records, and having sufficient density to serve as a correcting mask on printing, and then forming a positive, substantially cure dye image of the object in the same element by a treatment involving the use of silver solvents.

3. The method of making a colored photographic printing element, which comprises exposing a film having three superposed layers differentially-sensitized to record the primary colors, to a natural-color object, treating the film to form at least one metallic gold, negative image of the object in the layers, said negative image being a negative image representing the color which the layer in which it is located records, and then forming a positive, natural-color image of the object in the layers by a treatment involving the use of a permanganate solution.

RALPH M. EVANS.